(12) United States Patent
Kaimal

(10) Patent No.: US 12,028,251 B2
(45) Date of Patent: Jul. 2, 2024

(54) METHODS AND SYSTEMS FOR ROUTING NETWORK TRAFFIC AMONG ORGANIZATIONS USING A SERVICE-ORIENTED PROTOCOL

(71) Applicant: Karunesh Rama Kaimal, Fremont, CA (US)

(72) Inventor: Karunesh Rama Kaimal, Fremont, CA (US)

(73) Assignee: Karunesh Rama Kaimal, Brentwood, CA (US)

( * ) Notice: Subject to any disclaimer, the term of this patent is extended or adjusted under 35 U.S.C. 154(b) by 260 days.

(21) Appl. No.: 17/591,900

(22) Filed: Feb. 3, 2022

(65) Prior Publication Data

US 2023/0246961 A1 Aug. 3, 2023

(51) Int. Cl.
*H04L 45/745* (2022.01)
*H04L 45/00* (2022.01)
*H04L 45/02* (2022.01)

(52) U.S. Cl.
CPC ........... *H04L 45/745* (2013.01); *H04L 45/04* (2013.01); *H04L 45/20* (2013.01)

(58) Field of Classification Search
None
See application file for complete search history.

(56) References Cited

U.S. PATENT DOCUMENTS

| | | | |
|---|---|---|---|
| 7,957,369 B2 | 6/2011 | Fayad et al. | |
| 9,143,839 B2 | 9/2015 | Reisman | |
| 9,807,004 B2 | 10/2017 | Koley et al. | |
| 11,050,668 B2 | 6/2021 | Luke et al. | |
| 2004/0174829 A1* | 9/2004 | Ayyagari | H04L 45/02 370/254 |
| 2016/0277463 A1* | 9/2016 | Nagarajan | H04L 45/026 |
| 2019/0288861 A1* | 9/2019 | Andersson | H04L 61/5092 |
| 2020/0374228 A1* | 11/2020 | Yang | H04L 45/123 |

* cited by examiner

*Primary Examiner* — Xavier S Wong

(57) ABSTRACT

Embodiments of the present disclosure provide systems and methods for routing network traffic among organizations using service-oriented protocol. Method implemented at first network device associated with first autonomous system (AS) includes accessing routing table and service information of first AS, service information accessed based on organization identifier of organization of first AS. Method includes sending service messages to establish organization transit gateway protocol (OTGP) session with second network device of second AS. Upon receiving positive acknowledgement for each service message, method includes transferring data packets to second network device based on OTGP routing information relating to organization. Service messages include first service message for initiating discovery operation of second network device, second service message for performing negotiation operation with second network device, third service message for establishing linked network path with second network device, and fourth service message to transmit OTGP routing information for routing data packets.

10 Claims, 6 Drawing Sheets

METHODS AND SYSTEMS FOR ROUTING NETWORK TRAFFIC AMONG ORGANIZATIONS USING A SERVICE-ORIENTED PROTOCOL

TECHNICAL FIELD

The present technology disclosure relates to a network routing protocol and, more particularly to, methods and systems for routing network traffic from network devices within the same or different organizations using a service-oriented protocol.

BACKGROUND

With advancements in the Internet, the number of devices connected to the Internet increased exponentially. As a result, the number of routes, i.e., the path across which a data packet travels on a network, increased. Therefore, routing protocols have evolved over the years to manage internet traffic. The routing protocols enable routers to learn about the routes that may exist on a network, form routing tables and perform routing decisions. Some examples of routing protocols include Interior Gateway Routing Protocol (IGRP), Enhanced Interior Gateway Routing Protocol (EIGRP), Open Shortest Path First (OSPF), Border Gateway Protocol (BGP), and integrated Intermediate System-Intermediate System (ISIS). To keep a track of the profusion of the routes, autonomous systems are deployed within the Internet. An autonomous system (AS) is a network or a group of networks having a unified routing policy and serviced by the same Internet service provider (ISP). An AS may control a set of Internet Protocol (IP) addresses for delivering data packets to any of the set of IP addresses.

According to the BGP, data packets may cross the network by hopping from AS to AS until they reach a destination AS that contains their destination IP address. Different autonomous systems on the network may share routing information using Border Gateway Protocol (BGP) to enable the hopping of the data packets. It may be noted that gateways of autonomous systems, i.e., autonomous system boundary routers (ASBR), may collect routing information from their neighbors, maintain routing tables, and advertise to their neighbors. Further, the routing protocol, such as the BGP is dynamic to incorporate new routes or changes in the routes.

Specifically, BGP allows independently operated networks, i.e., AS to inform each other about their reachability. Each time a BGP router advertises its reachability, also called IP prefix, to its neighbor, the newly received information is compared against the router's stored knowledge. If this new advertisement provides a better path based on various factors, for example, traffic, number of router hops, bandwidth, reliability, and so forth, to reach a certain network, the information is updated locally, and all immediate neighbors are informed. In this way, networks worldwide can reach each other, forming the complex topology of the global internet.

However, routing of the data packets based on the BGP routing protocol has several shortcomings. Routing of data packets based on BGP leads to long paths for transmission of data packets resulting in constant delays. In certain cases, such delays may further affect sales conversion rates, impact the quality of service and cause potential user frustration. In addition, there may be packet loss due to the routing of data packets based on BGP attributes. Due to any packet loss, the quality of a file, such as a video conference, video streaming, and real-time document collaboration, may be severely negatively impacted. Furthermore, the BGP routing protocol may not take into consideration any malfunctioning or inconsistencies of routing equipment. As a result, the user may be unable to access data until the routing equipment is restored, thereby causing delay and user frustration. Moreover, the BGP routing protocol is prone to several security threats owing to, for example, route manipulation, route hijacking, denial of service, and the like. Due to no digital identifiers of BGP routers, there is implicit trust between the BGP routers. In case of any inadvertent or malicious misconfiguration of a router, for example, if a router advertises itself as the best path to an unrelated network, the network may be severely impacted rendering the Internet vulnerable and unstable. Further, a BGP router may be advertising neighbors' paths that may lead to redundant advertising. Furthermore, an update in routing information may take a longer duration to propagate within an AS relating to a BGP router.

Typically, the Internet service provider (ISP) of an organization may use the autonomous systems to send organization data packets from a source node to a destination node. The organization data packets may be data packets that may be generated by a source node that may be connected to an organization network and may conform to organization policies of data transmission. The organization network may further have to purchase and deploy additional security devices for, for example, encryption, traffic monitoring, defining policies, and so forth.

However, the ISP does not provide any additional services relating to security for the routing of the data packets. In addition, for forwarding the data packets from one AS to another AS, certain routing attributes relating to routing protocols, such as BGP attributes, may need to be fulfilled. In certain cases, an ISP associated with a source or speaker AS may be different from an ISP associated with a destination or listener AS. In such cases, traffic traversal from one AS to another AS may be done irrespective organization's policies. As a result, certain routing policy attributes may not be compliant with organization policies and might not be needed. This may pose security threats for critical organization data. Further, the organization data packets are prone to security threats due to vulnerabilities of the BGP routing protocol. This may affect the integrity and confidentiality of organization data.

There is a need to overcome the drawbacks of the conventional routing protocol and enable organizations to route data packets securely and seamlessly.

SUMMARY

Various embodiments of the present disclosure provide methods and systems for routing network traffic of organizations using a service-oriented protocol.

In one embodiment, a computer-implemented method is disclosed. The computer-implemented method implemented at a first network device of a first autonomous system includes accessing a routing table and service information associated with the first autonomous system, the service information being accessed based, at least in part, on an organization identifier of an organization associated with the first autonomous system. The method includes sending a plurality of service messages to establish an organization transit gateway protocol (OTGP) session with a second network device associated with a second autonomous system. The plurality of service messages includes a first service message to be transmitted over a pre-configured port to initiate a discovery operation of the second network device, and a second service message to be transmitted to perform a negotiation operation with the second network device. The negotiation operation is performed for a set of parameters relating to data transfer. The plurality of service messages further includes a third service message to be transmitted to establish a linked network path with the second network device based at least on the set of parameters, and a fourth service message to be transmitted to initiate a data transfer operation. The data transfer operation includes the transmission of OTGP routing information for the routing of data packets, wherein the OTGP routing information is determined based on the service information of the organization. Upon receiving a positive acknowledgment corresponding to each of the plurality of service messages from the second network device, the method includes transferring, by the first network device, data packets to the second network device based on the OTGP routing information relating to the organization.

In another embodiment, a device is disclosed. The device includes a memory, an interface, and a processor. The processor is communicably coupled with the interface and the memory. The memory stores instructions that configure the processor to perform at least access a routing table and service information of a first autonomous system. The first autonomous system is associated with the device. The service information is accessed based at least in part on an organization identifier of an organization associated with the first autonomous system. The processor is configured to send a plurality of service messages to establish an organization transit gateway protocol (OTGP) session with a network device associated with a second autonomous system. The plurality of service messages includes a first service message to be transmitted over a pre-configured port to initiate a discovery operation of the network device, and a second service message to be transmitted to perform a negotiation operation with the network device. The negotiation operation is performed for a set of parameters relating to data transfer. The plurality of service messages further includes a third service message to be transmitted to establish a linked network path with the network device based at least on the set of parameters, and a fourth service message to be transmitted to initiate a data transfer operation. The data transfer operation includes the transmission of OTGP routing information for the routing of data packets, wherein the OTGP routing information is determined based on the service information of the organization. Upon reception of a positive acknowledgment corresponding to each of the plurality of service messages from the network device, the processor is configured to transfer the data packets to the network device, based on the OTGP routing information relating to the organization.

In yet another embodiment, a non-transitory machine-readable storage medium is disclosed. The non-transitory computer-readable storage medium provides instructions that, if executed by a processor of a device acting as an organization transit gateway protocol (OTGP) router associated with a first autonomous system, cause the processor to perform operations including accessing a routing table and service information associated with the first autonomous system. The service information is being accessed based, at least in part, on an organization identifier of an organization associated with the first autonomous system. The processor is further caused to perform an operation including sending a plurality of service messages to establish an organization transit gateway protocol (OTGP) session with a network device associated with a second autonomous system. The plurality of service messages includes a first service message to be transmitted over a pre-configured port to initiate a discovery operation of the network device, and a second service message to be transmitted to perform a negotiation operation with the network device. The negotiation operation is performed for a set of parameters relating to data transfer. The plurality of service messages further includes a third service message to be transmitted to establish a linked network path with the network device based at least on the set of parameters, and a fourth service message to be transmitted to initiate a data transfer operation. The data transfer operation includes the transmission of OTGP routing information for the routing of data packets, wherein the OTGP routing information is determined based on the service information of the organization. The processor is further caused to perform an operation including transferring the data packets to the network device based on the OTGP routing information relating to the organization upon receiving a positive acknowledgment corresponding to each of the plurality of service messages from the network device.

BRIEF DESCRIPTION OF THE FIGURES

The following detailed description of illustrative embodiments is better understood when read in conjunction with the appended drawings. To illustrate the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers.

DETAILED DESCRIPTION

Figure 1:
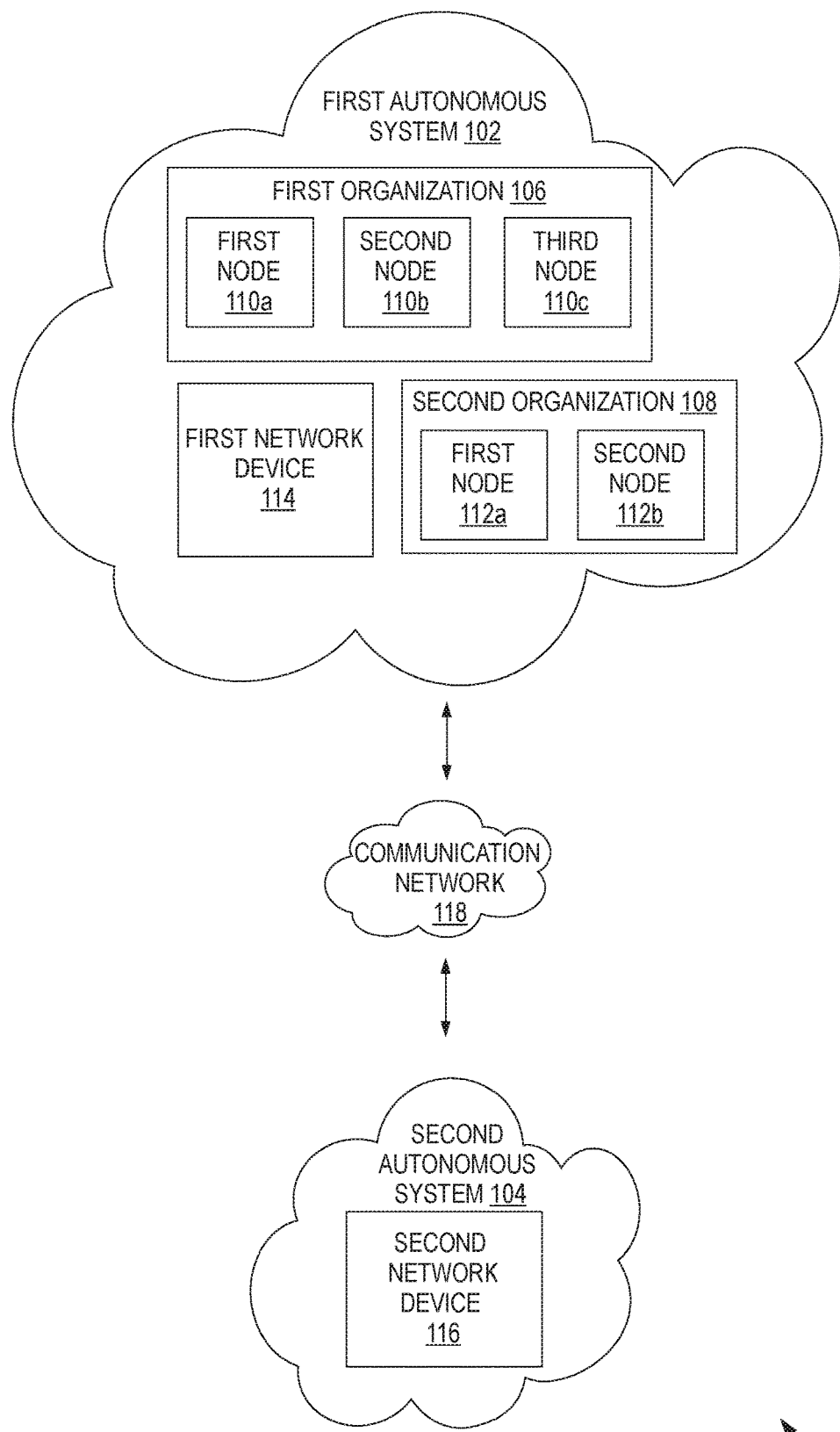
FIG. 1 illustrates an exemplary representation of an environment related to at least some example embodiments of the present disclosure.

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein.

Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or conjunction with each other, one skilled in the art will appreciate that many of these features can be provided independently of other features. Accordingly, this description of the present disclosure is set forth without any loss of generality to, and without imposing limitations upon, the present disclosure.

The term "Internet Service Provider (ISP)", used throughout the description refers to an organization that may enable web access and other services, such as email service, domain registration, web hosting, and browser services, to organizations and individual consumers. The users of ISP offerings are referred to herein as 'customers' of the ISP. In many scenarios, customers of an ISP may be an organization or users associated with an organization. In such case, customers may register with the ISP to avail services relating to accessing, using, or participating in the Internet. For example, the ISP may be a tier 2 or a tier 3 ISP. An ISP may include multiple autonomous systems.

The term "autonomous system (AS)", used throughout the description refers to a set of Internet routable IP prefixes belonging to a network that may be managed, controlled, and supervised by an administrative entity. The administrative entity of the autonomous system may be the ISP. The AS may control a collection of connected routing prefixes that represent different IP addresses, based on a common routing policy of the ISP. For example, an autonomous system may be assigned an autonomous system number (ASN) for routing of data packets to, from, and/or through the autonomous system. An AS may be a communications network including routing nodes for routing data packet flows to the correct destination address. The AS may be an Internet Service Provider, an organization, or an entire corporate network, including multiple locations (IP addresses).

The term "BGP" or "border routing protocol", used throughout the description, refers to standardized exterior gateway protocol designed to exchange routing and reachability information between autonomous systems (AS) on the Internet. BGP may enable the connection between any networks of autonomous systems using an arbitrary topology. In particular, BGP requires that each AS have at least one network device (such as, router) that can run BGP and that the network device connects to at least one other BGP network device across any of the autonomous systems. The main function of the BGP is to exchange network reachability information with other BGP systems for peering between two network devices.

The term "network device", used throughout the description, refers to networking hardware or an electronic device that may be required for communication and interaction between devices on a computer network. The network device may be a router, specifically, an Organization transit gateway protocol (OTGP) router that connects an AS to other autonomous systems maintained and controlled by the same ISP or different ISP. Specifically, the network device may mediate data transmission on a computer network.

Overview

Various embodiments of the present disclosure provide a method, a network device, and a computer-readable storage medium for routing data packets using a service-oriented protocol.

In an embodiment, a network device is disclosed. The network device is referred to as a first network device, for sake of clarity. The first network device is configured to access a routing table and service information associated with a first autonomous system (AS). The service information may be accessed based at least in part on an organization identifier of an organization associated with the first autonomous system. The first network device may be an Organization transit gateway protocol (OTGP) router that connects the first AS to other autonomous systems maintained and controlled by the same ISP or different ISP. In particular, the first network device may be an OTGP speaker during a first time period, during which the first network device may exchange routing and reachability information with its neighboring routers.

The first autonomous system may be a network that is controlled by an ISP, based on a common routing policy. For example, an organization may run within the first AS using public or private ASN to the corresponding ISP, wherein the ISP connects the organization to the Internet. Subsequently, the ISP may provide web services to the organization, specifically, computing nodes associated with the organization, using the first AS. The manner in which the first network device, i.e., the OTGP router operates is described in detail throughout the present disclosure.

The present disclosure provides a service-oriented Internet routing protocol referred to as 'Organization Transit Gateway Protocol' or 'OTGP'. The routing protocol defined in the present disclosure is meant to carry internet traffic or data packets from different organizations, businesses, data centers, or clouds to enable the customers to avail web services, based on policy requirements of the organizations or customers.

The present disclosure describes an Organization Transit Gateway Protocol (OTGP) that is developed based on Reach, Attempt, Interconnect, and Network (RAIN) architecture. The RAIN architecture is deployed to form neighbors in the communication network for traffic forwarding, high availability, path selection, and so forth. As may be understood, the conventional routing protocols, such as Border Gateway Protocol (BGP), Transmission Control Protocol (TCP), User Datagram Protocol (UDP), and the like focusses on peering between two routers, for example, from different autonomous systems. However, the conventional routing protocols do not account for conditions to successfully form neighbors in the communication network for reliable and secure data transmission. The OTGP, based on the RAIN architecture, overcomes the security drawbacks associated with the conventional routing protocols and enables secure data transmission by forming secure neighbor communication links or network paths.

Since this OTGP protocol forms neighbors based on the service type and if the service is secured that means all the routers forming neighbors will complete phase 1 of the IPsec tunnel. The keys used by the customer/organization will be used in phase 2 to encrypt traffic and send it across that phase 1 tunnel formed by the routers. So the customer here really doesn't need any security appliance or any other equipment. In one example, everyone has internet connectivity at home/office/shops to large corporations. But small entities or individuals don't have the option to get enterprise-level services without spending a significant amount purchasing security appliances which the OTGP routing protocol gives.

Various embodiments of the present disclosure offer multiple advantages and technical effects. For instance, the exchange of routing information is performed to form a stateful communication link with neighbor network devices, or OTGP routers, based on customer or organization requirements regarding routing policies. In this manner, the present disclosure provides a novel organization transit gateway protocol (OTGP) for routing of data packets from an organization within a first autonomous system to the outside, i.e., to another organization within a second autonomous system, based on the service information associated with the organization. The present disclosure enables functionality to the operation of ISP for allowing traffic traversal for accessing the Internet, based on the service information desired by the organization. The service information defined by the organization may include functions such as encryption policies, access policies, allowing, denying, and so forth. Subsequently, the organization may no longer need to purchase and deploy network products for, for example, encryption, policing, and security of network traffic during traffic traversal from the corresponding autonomous system to another AS. Due to this, costs associated with secure and reliable networking of an organization may decrease. Moreover, delay or latency due to incoherent operations of the additional network products may be eliminated due to stateful communication links established between the neighbors of the first AS.

Furthermore, the stateful communication link is established based on the service information of the organization, wherein the service information may include certain policies or attributes for routing of data packets based on the organization's needs. Due to this, security risks associated with malicious paths between the autonomous systems are substantially reduced. Moreover, due to the incorporation of organization identifiers for establishing the communication link, authenticity and reliability of the path are maintained, thereby substantially reducing delays due to faulty or non-responsive paths and data packet loss. Traffic traversal from one autonomous system to another autonomous system, controlled by the same or different ISP, is performed based on the needs and policies of the organization, thereby ensuring the security of data and stability on the Internet even during hopping from one AS to another AS that are provided by different ISPs.

Various embodiments of the present disclosure are described hereinafter with reference to FIG. 1 to FIG. 6.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, facilitating routing of data packets using an organization transit gateway protocol (OTGP). The environment 100 generally includes a plurality of autonomous systems (for example, a first autonomous system (AS) 102 and a second autonomous system (AS) 104). The term 'autonomous system' as used throughout the description may refer to a network having a unified routing policy that may be managed by an administrative entity, such as an associated ISP, a large enterprise technology company, a university, or a government agency. In particular, a computing node may connect to the AS to access the Internet and avail of the services offered by the ISP.

The Autonomous System (AS) is defined as a logical portion of a larger IP network. An AS normally includes internetwork within an organization. It is administered by a single management authority. An AS can connect to another AS managed by the same organization. It can also connect to other public or private networks.

The environment 100 operates in the context of a data communication network including multiple network elements. Some of the network elements in a network may be network devices such as routers, switches, gateways, or servers. The network device may include, for example, a processor, memory, interfaces, and a bus. While a certain number of entities are depicted in the environment 100 for purposes of illustration, other environments may include any number or arrangement of nodes. The depiction of the environment 100 as described below herein is only illustrative and should not be construed as limiting in any manner.

In an example, the first AS 102 may include a first organization 106 and a second organization 108. In particular, the first organization 106 may include a first cluster of nodes, depicted as nodes 110a, 110b, and 110c, and the second organization 108 may include a second cluster of nodes, depicted as nodes 112a and 112b. Herein, the nodes 110a-110c and nodes 112a and 112b may be computing entities, such as computing devices or network devices that may be capable of sending data packets, receiving data packets, processing data packets, and/or routing data packets. In another example, the nodes 110a-110c, 112a, and 112b may be computing devices that may be used for accessing the Internet and avail various services, such as email, video conference, video stream, gaming, and so forth, by users within organizations 106 and 108, respectively. For example, each of the nodes 110a-110c, 112a, and 112b may have a corresponding unique IP address for its identification on the Internet.

In accordance with embodiments of the present disclosure, the autonomous systems, i.e., the first AS 102 and the second AS 104 further include a first network device 114 and a second network device 116, respectively. The network device is used interchangeably with the OTGP router in the description, however, it should not be interpreted as a limitation. Other examples of the network device may include, but are not limited to, gateways, switches, bridges, hubs, and so forth. In one example, the first network device 114 and the second network device 116 may each administer organization transit gateway protocol. Each network device 114 and 116 may establish a neighbor relationship with other network devices in the same area or different areas of the network. Each network device 114 and 116 may receive route update information from its neighbors. In an example, route update information may be received through a flooding process. Each network device 114 and 116 may maintain a routing table, for example, for storing its route information and route update information obtained from its neighbors. The operation of OTGP routers 114 and 116 is described in detail with respect to the following figures.

Returning to the present example, the first AS 102 and the second AS 104 may be interconnected by corresponding OTGP routers 114 and 116, via a communication network 118. For example, the communication network 118 may be embodied as a wired network, a wireless network, or a combination of wired and wireless networks. Some non-limiting examples of the wired network include Ethernet, Local Area Network (LAN), Optical Fiber network or combinations, thereof. Some non-limiting examples of the wireless network include a cellular network, a wireless LAN (WLAN) network, a Bluetooth or a ZigBee network, and combinations thereof. An example of a combination of a wired network and a wireless network is the Internet. Various entities in the environment 100, such as the OTGP routers 114 and 116, may connect to the communication network 118 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, and the like.

In an example, routing decisions within each of the first AS 102, and the second AS 104 may rely on an interior gateway protocol (IGP), such as Open Shortest Path First (OSPF) or Intermediate System-to-Intermediate System (ISIS). Further, for routing data packets outside the respective AS, for example, from first AS 102 to second AS 104, OTGP routing information may have to be exchanged among the autonomous system 102 and 104s using an exterior gateway protocol, such as organization transit gateway protocol (OTGP). For example, the first network device 114 in the first AS 102 may exchange routing information with the second network device 116 in the second AS 104 using a plurality of service messages.

In an example, communication between the first network device 114 and the second network device 116 may be affected by exchanging discrete organization data packets or messages in accordance with protocols, such as Transmission Control Protocol/Internet Protocol (TCP/IP). It may be noted that the representation of only two autonomous systems 102 and 104 is only illustrative and any number of autonomous systems may be included in the environment 100. Moreover, any number of OTGP routers may be present in a single autonomous system and an OTGP router may be connected to any number of OTGP routers from other autonomous systems. It will be understood by those skilled in the art that the organization transit gateway protocol (OTGP) as discussed herein is described to be used in conjunction with TCP/IP protocol for communication. The OTGP provides unique features for organizations to route all types of traffic mainly IPv4, IPv6, or ethernet frames. The OTGP enables customers/organizations to implement some sort of policy on their vendor ISP infrastructure.

However, this should not be construed as a limitation and in other examples of the present disclosure, and the OTGP may be implemented in conjunction with FTP, UDP, HTTP, IMAP, SMTP, IGP, BGP, and so forth, without departing from the scope of the disclosure.

In operation, a session within the environment 100 may involve the first network device 114 and the second network device 116 for establishing a communication line for data packet routing and transfer. For example, each of the first network device 114 and the second network device 116 executes one or more routing protocol processes and performs the function of the border or edge router of the first AS 102 and the second AS 104, respectively. The first network device 114 then exchanges routing information with the second network device 116.

In an example, the first network device 114 may access a routing table. As may be understood, the routing table objects may establish a binding between protocol addresses and link-layer addresses for routers sharing the same physical link. The routing table may allow the first network device 114 to look at router bindings and their properties. For example, the routing table may be updated to add a new neighbor router or delete old and/or dysfunctional routers. The routing table may be stored within a memory element of the first network device 114 or may be stored remotely from the first network device 114 and the first AS 102.

Under the present disclosure, the first network device 114 may advertise to the second network device 116 based on service information defined for the first organization 106. The service information relating to the first organization 106 may indicate requirements or policies of the first organization 106, for example, that may be defined by an administrator of the first organization 106. The service information for the first organization 106 may be accessed based on an organization identifier associated with the first organization 106. In this manner, routing of data packets from the first organization 106 to the second AS 104, via the first AS 102, may be regulated based on service information defined for the first organization 106. Subsequently, additional features, such as network security functionality and policing functionality, may be provided by the ISPs in integration with the routing functionality. As a result, small entities or individuals may avail enterprise-level network security services without spending a significant amount on the purchase of network security appliances, such as firewalls, Fortinet, and so forth. How the OTGP operates, is described in further detail with respect to the appended figures below.

Figure 2:
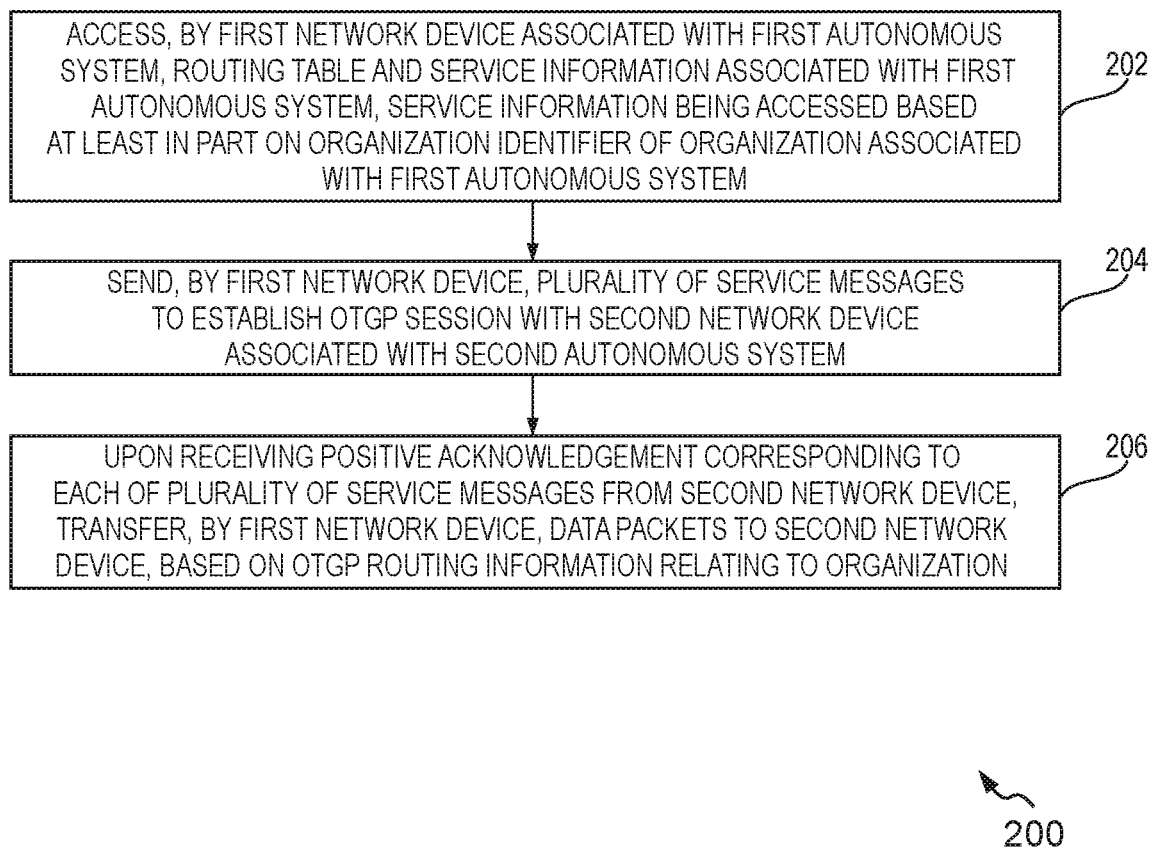
FIG. 2 is a flow diagram of a computer-implemented method for establishing a communication session between two network devices of different autonomous systems, in accordance with an embodiment of the present disclosure.

FIG. 2 is a flow diagram of a computer-implemented method 200 for establishing a communication session between two network devices of different autonomous systems, in accordance with an embodiment of the present disclosure. The method 200 depicted in the flow diagram may be executed by, for example, the processor of the first network device 114. Operations of the flow diagram of the method 200, and combinations of operation in the flow diagram of the method 200, may be implemented by, for example, hardware, firmware, a processor, circuitry, and/or a different device associated with the execution of software that includes one or more computer program instructions. It is noted that the operations of the method 200 can be described and/or practiced by using a system other than these server systems. The method 200 starts at operation 202.

The method 200 is explained as a process performed at any network device enabled with the OTGP protocol of autonomous systems. For sake of clarity, the steps of the process are described to be executed by the first network device 114, i.e., the first OTGP router, within the first AS 102, as illustrated in FIG. 1.

At the operation 202, the method 200 includes accessing, by the first network device 114, a routing table and service information associated with the first autonomous system 102. In an example, the first network device 114 may retrieve the routing table from an associated memory. Further, the routing table may include information pertaining to neighbors of the first network device 114, wherein the neighbors may be connected with the first network device 14 by the same physical link. For example, the routing table may include information, such as MAC address of neighbors, properties of neighbors, IP address of neighbors, communication port of the neighbors, and so forth.

Further, the first network device 114 accesses the service information relating to the first AS 102. In particular, the service information is accessed based at least in part on an organization identifier of a first organization 106 (referred to as organization 106, hereinafter) associated with the first AS 102. The organization identifier may be a unique identifier allocated to the organization 106 when the organization 106 may register with an ISP associated with the first AS 102. Subsequently, a network administrator of the organization 106 may define the service information, for example, at the time of registering, or later. For example, such service information may be stored in conjunction with the organization identifier, within a database associated with the ISP. To this end, on identifying nodes, such as nodes 110a-110c, associated with the first organization 106 within the first AS 102, the first network device 114 may retrieve its organization identifier and further access the service information corresponding to the first organization 106. It may be noted that the organization identifier may be the same for different nodes 110a-110c within the first organization 106.

At operation 204, the method 200 includes sending, by the first network device 114, a plurality of service messages to establish an organization transit gateway protocol (OTGP) session with a second network device 116 associated with a second autonomous system 104. For example, the plurality of service messages may be referred to as OTGP packets. The plurality of service messages may be sent iteratively to the second network device 116. Each service message includes a packet header including a set of data fields, which are provided as below:

(a) Operation field: It includes data required to satisfy the conditions described by the value of the Type field in the packet header. In other words, the operation field in the packet header of the service message may carry data pertaining to actions associated with the OP, i.e., the action to be performed based on the transmission of the OP to the second network device 116.

(b) Error field: It represents an error message.

(c) Type field: The 'type field' indicates the operation type of an operation of the service message. The operation may be one of: (1) 'REACH', (2) 'ATTEMPT', (3) 'INTERCONNECT', (4) 'NETWORK', and (5) 'DESTROY'.

(c) Length field: It represents the total length of the service message.

(d) Version field: It represents a version identifier of the running OTGP routing protocol.

(e) Time To Live (TTL) field: It indicates the number of routers or network devices that the service message has passed through.

Before forwarding the plurality of service messages to the second network device 116, the first network device 114 may check if the second network device 116 is pingable or not based on the routing table. Once the second network device 116 is pingable, the first network device may start to send the plurality of service messages to the second network device 116 to form a neighbor relation therewith.

In one embodiment, the first network device 114 transmits the first service message over a pre-configured port. The pre-configured port may be a communication port over which the peer router may be listening. The first network device 114 transmits the first service message to initiate a discovery operation (i.e., 'REACH' operation) of the second network device 116. For example, the operation field of the first service message may carry data about discovery operations for peer routers or neighbors. Moreover, the first network device 114 may check if the peer routers are running on the same pre-configured port for an OTGP session, for example, by sending the first service message over the pre-configured port. In an example, the pre-configured port may be TCP port 399.

Upon receiving the first service message, the second network device 116 sends a first acknowledgment message according to the OTGP protocol. The operation field of the first acknowledge message indicates the operation type of the 'REACH' operation. In particular, the first acknowledgment message includes an identifier field of the second network device. The acknowledgment message includes that the second network device 116 acknowledges that the second network device is listening on TCP port 399.

The second service message is transmitted to perform a negotiation operation with the second network device 116. Once the first network device 114 identifies and confirms that OTGP is running on peers or neighbors, such as the second network device 116, the first network device 114 executes the 'ATTEMPT' operation to negotiate a set of parameters relating to data transfer with the second network device 116. For example, the first network device 114 may check with the second network device 116 whether the second network device 116 is willing to accept the set of parameters.

The set of parameters relates to service parameters over which the OTGP may run to connect to the second network device 116. The service may be, for example, TCP, UDP, port, IGP, IP, BGP, or any other protocol that may be developed later. For example, the set of parameters for data transfer includes at least one of: service type, IP type, preferred path, cluster identifier, and version. It may be noted that service type may indicate service configured for the particular organization 106 and may be determined based on the service information. The IP type may be one of: static, dynamic, public, and private. The cluster-id may be a unique identifier given to a cluster operating in the network environment, to which the first network device 114 may also belong. The preferred path may indicate a path from multiple high availability (HA) paths for a single service that may be selected automatically, or based on user selection. Further, the version may be the version of the OTGP running on the second network device 116 and the first network device 114. Alternatively, when the first network device 114 finds that none of the neighbors accept the set of parameters, then the first network device 114 may send an error to the organization nodes 110a-110c and may peer with default parameters with one or more network devices, such as the second network device 116.

The third service message is transmitted to establish a linked network path with the second network device 116, based on at least the set of parameters. The fourth service message is transmitted to make sure that neighbor relationship with the second network device 116 is formed and the second network device 116 has full reachability from the first network device 114, via the linked network path between them. The linked network path is formed based on the negotiated set of parameters of service of the OTGP.

The fourth service message is transmitted to initiate a data transfer operation. The data transfer operation comprises transmission of OTGP routing information for routing of data packets. The OTGP routing information is based on the service information of the organization. For example, the fourth service message may be populated with actual organization data packets and sent to the second network device 116, along with the OTGP routing information. The OTGP routing information may be based on service information defined by the organization 106. For example, the service information may indicate services, for example, service plans or custom plans, selected by the organization 106 for traffic traversal and data transfer.

At operation 206, the method 200 includes transferring, by the first network device 112, data packets to the second network device based on the OTGP routing information relating to the organization upon receiving a positive acknowledgment corresponding to each of the plurality of service messages from the second network device 116. For example, the reachable linked network path (or preferred path) may be used for sending the data packets from the first organization 106 to the second network device 116, via the first network device 114. It may be understood, the first network device 114 may forward all network information (for example, OTGP routing information) about the service of the organization 106 to any one active preferred neighbor, such as the second network device 116. When the connection between the first network device 114 and the second network device fails, the first network device may switch to another active per to establish a neighbor relationship therewith.

Figure 3:
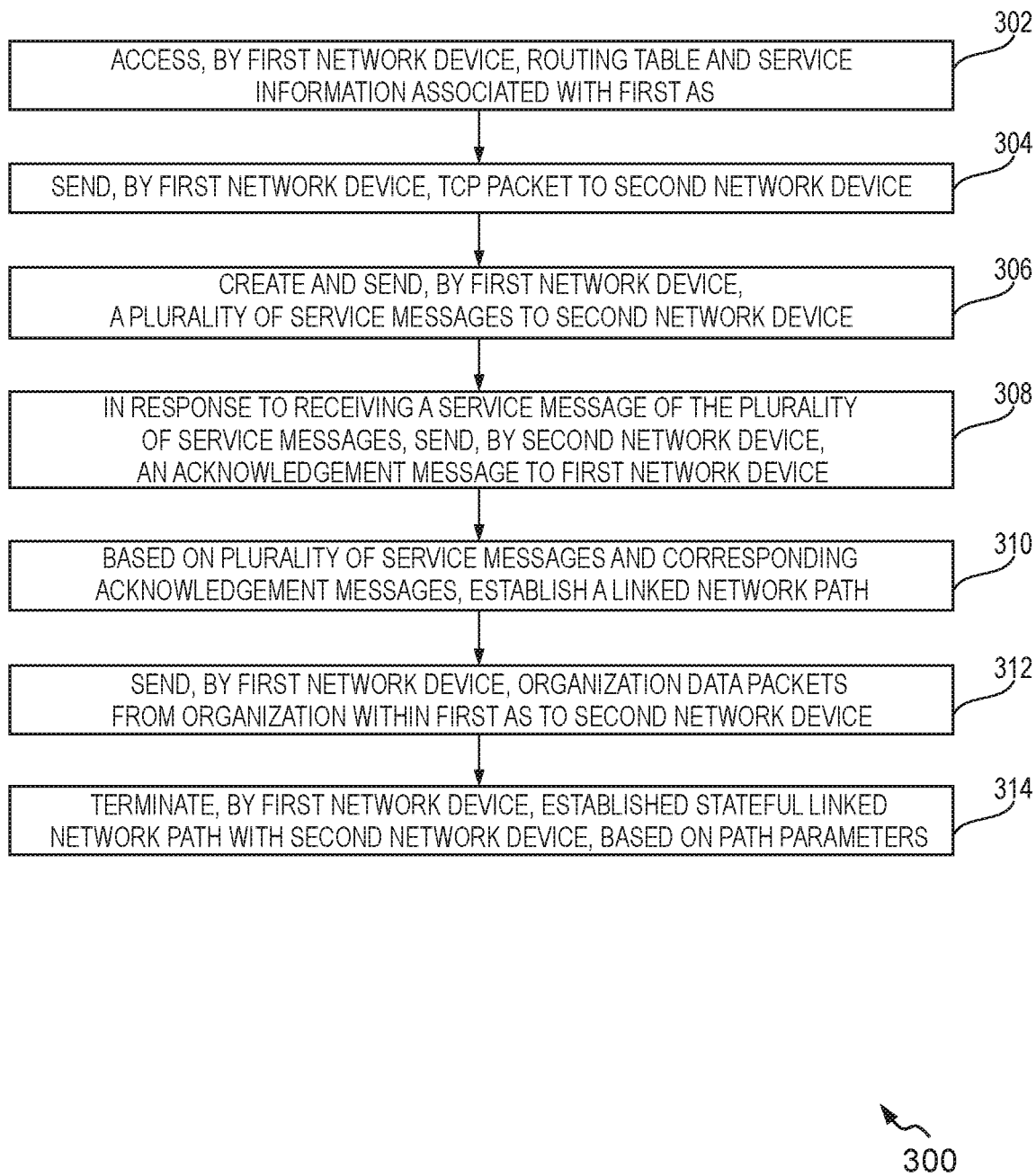
FIG. 3 is a process flow of neighbor handshaking process between two network devices according to organization transit gateway protocol, in accordance with an embodiment of the present disclosure.

FIG. 3 is a process flow of neighbor handshaking process between two network devices according to organization transit gateway protocol, in accordance with an embodiment of the present disclosure.

At 302, the routing table and service information for a first autonomous system (AS) 102 is accessed by a first network device 114. In this regard, the first network device 114 may retrieve the routing table that may include, for example, information about peer network devices having a physical link with the first network device 114. Moreover, the service information may be retrieved based on the organization identifier of an organization 106 within the first AS 102.

In an example, the organization identifier for the organization 106 may be allocated to the organization 106 at a time of registry. The organization 106 may register with an Internet service provider (ISP) to avail services offered by the ISP, such as web services, email services, video streaming services, and the like. To this end, the organization 106 may also select a service plan based on the requirements of the service. In an example, the service plan may be one or more of: the first plan for only Internet service, a second plan for the Internet as well as DTH services, the third plan for network security with the Internet service, the fourth plan for encryption based on organization identifier and network security along with the Internet service, and so on. It may be noted that the above-described plans are only illustrative, and the ISP may offer a plurality of different plans based on different services offered by the ISP, cost, and requirements of the organization 106. The ISP may then assign an organization identifier to the organization 106 and store service information (or selected service plan) relating to the organization in conjunction with the organization id. In certain cases, the organization 106 may build a custom service plan based on their requirements.

Pursuant to present disclosure, the ISP may assign a unique organization identifier to the organization 106, for example, based on autonomous system number (ASN) associated with the first autonomous system 102. Further, the ISP may also associate a vendor identifier with the organization identifier. The vendor identifier may be a unique identifier associated with a vendor for the ISP. By associating the vendor identifier with the organization identifier, the ISP may select a preferred vendor ID.

For example, an administrator associated with the first organization 106 may select a service plan for the organization. The administrator may further add nodes, such as nodes 110a, 110b, and 110c to an organization network. In particular, on registering with the ISP, an organization network may be established with the organization id. The nodes 110a-110c may connect to the organization network to access web services offered by the ISP via the organization network. Although multiple organization nodes are described in the present example, however, in some cases a single organization node may be present within an organization.

To this end, the organization network may connect to a first AS 102 network to avail services from the ISP and further provide services to the nodes 110a-c. Further, the first AS 102 includes at least one first network device 114 for routing of organization data packets outside of the first AS 102, such as to a second AS. For example, the first AS 102 may correspond to the organization network, or may include other organization networks. In cases where multiple organization networks are present within the first AS 102, different network devices may be responsible for the routing of data packets from different organization networks.

At 304, the first network device 114 sends a TCP packet to the second network device 116. Based on the routing table, the first network device 114 determines which interface/routing protocol or route table is needed to reach the second network device to initiate the OTGP session. For example, the first network device 114 sends TCP data packets to check if the second network device 116 is listening on a pre-configured TCP port, for example, TCP 399 port. In this manner, the first network device 114 checks if the second network device 116 is reachable or pingable in the first place.

At 306, the first network device 114 creates and sends a plurality of service messages to a second network device 116. The first network device 114 may send the plurality of service messages to a peer network device to establish a stateful linked network path, iteratively, to form a neighbor communication link. In this regard, the first network device 114 sends a first service message to the second network device 116. The first service message (or first organization packet (OP)) includes a packet header, wherein the packet header of the first OP indicates data relating to the 'REACH' operation. The first OP corresponding to the 'REACH' operation is transmitted to initiate probing or discovery of any peer, such as the second network device 116. The probing is performed based on the pre-configured port at which the second network device 116 is listening for the OTGP session. On receiving the first OP or service message, the second network device 116 may send a positive acknowledgment to the first network device 114.

The first OP may probe if all the directly connected peers of the first network device 114 are listening on a preconfigured TCP port, such as TCP port 399, or any other pre-configured port, for OTGP session. If the first network device 114 is not directly connected to a peer network device, the first network device will still probe based on a set of conditions. Examples of the conditions include, but are not limited to, the peer is reachable via an interior gateway, the peer is pingable, an identifier of the peer is not NULL, and the Time to Live (TTL) value of the peer is not set to 0.

Thereafter, the first network device 114 sends a second service message to the second network device 116. The second service message (or second OP) includes a header, wherein the header of the second OP indicates data relating to an 'ATTEMPT' operation. The second OP corresponding to the 'ATTEMPT' operation is transmitted to perform negotiation of a set of parameters relating to data transfer, between the first network device 114 and the second network device 116. For example, the first network device 114 may embody values relating to a set of parameters in the second OP or service message. If the second network device 116 agrees with the values corresponding to the set of parameters, it may send a positive acknowledgment for the same. The set of parameters may include, for example, IP type, service type, preferred path, cluster id, and version.

To ensure high availability in the network, multiple paths may be provided for a single service. For example, multiple network paths may exist between the first network device 114 and the second network device 116. In one example, the preferred path may be auto-selected based on K metric calculation. In another example, the preferred path may be explicitly configured by a user or a network administrator of the organization 106, for example, by changing the preferred path value.

It may be noted that probing of the peer or the second network device 116 is performed during the 'REACH' operation, before negotiating the set of parameters for data transfer during the 'ATTEMPT' operation. This is done to eliminate the need to broadcast the set of parameters. In the OTGP sessions, connection-oriented services are provided to the organizations and the data or set of parameters for servicing the organization are not broadcast. Further, the set of parameters for data transfer are negotiated before forming a neighbor relationship for routing of organization data packets. This ensures the security and stability of organization data packets and the reliability of service. Further, negotiating the parameters also forms a precheck to confirm that the neighbor, i.e. the second network device 116, supports the desired services selected by the organization 106. In particular, the service type may be determined based on the service information, wherein the service type indicates the service plan or service parameters selected by the organization 106. This further ensures that desired services are provided to the organization 106 without any disruption to meet Service-level agreements (SLA) and end-to-end quality of service (QoS).

Continuing further, the first network device 114 sends a third service message to the second network device 116. The third service message (or third OP) includes a header, wherein the header of the third OP indicates data relating to an 'INTERCONNECT' operation. The third OP corresponding to the 'INTERCONNECT' operation is transmitted to establish a linked network path with the second network device 116 based on at least the set of parameters. For example, the first network device 114 may embody values for a set of connection attributes in the third OP or service message.

Examples of the set of connection attributes may include, but are not limited to, peer status, hold time, organization or customer identifier, vendor or ISP identifier, revision identifier, and authentication. For example, the peer status may indicate a rank order of the network device in the agreed hierarchy, the hold time indicates a time period to be considered for receiving acknowledgment from the neighbor, ISP or vendor identifier may be a unique identifier of the ISP associated with the network device, revision identifier may be a unique id attached to routing table whose value changes based on the update, and authentication may be a password, such as a key, for authentication of the network device.

The second network device 116 may then send values corresponding to the set of connection attributes to the first network device 114. The first network device 114 may collect the values for the set of connection attributes and assign a connection tag to each peer connection (or path) between the first network device 114 and the second network device 116. In particular, the connection tag may be assigned to the multiple HA paths between the first network device 114 and the second network device 116. The connection tag may be one of a linked tag and an unlinked tag. In an example, the first network device 114 may perform a metric calculation based on the number of hops, latency, service type of the organization 106, and bandwidth. Based on the value of the metric, a connection tag may be assigned to each of the multiple paths. In particular, the linked tag may be assigned to a path having the lowest metric value and the unlinked tag may be assigned to other paths. Such a path having a linked tag may form the linked network path for data transfer.

Further, the first network device 114 sends a fourth service message to the second network device 116. The fourth service message (or fourth OP) includes a header, wherein the header of the fourth OP indicates data relating to a 'NETWORK' operation. The fourth OP corresponding to the 'NETWORK' operation is transmitted to initiate data transfer between the first network device 114 and the second network device 116 using a linked network path. The data may include OTGP routing information for routing of data packets, and wherein the routing information is determined based on the service information. In an example, the OTGP routing information may include organization protocol (OP) IP route, OP routing table, OP service table, OP link table, frames information, and so forth. Such OTGP routing information is determined based on the service information, specifically, service type or service plan selected by the organization 106.

For example, the first network device 114 may retrieve OTGP routing information corresponding to the service type of the organization 106, from a database associated with the ISP. Due to sharing the OTGP routing information with the second network device based on service type, a stateful linked network path or stateful neighbor communication link is established between the first network device 114 and the second network device 116 leading to faster convergence of the linked network path. In other words, based on the exchange of the plurality of service messages and corresponding positive acknowledgments, a stateful linked network path is established between the first network device 114 and the second network device 116. It may be noted that the first network device 114 reaches the 'INTERCONNECT' operation state before starting the 'NETWORK' operation' so that OTGP routing information including IP routes, network security messages, and routing policies are shared with the second network device 116 reliably and securely, ensuring the security of transfer of further organization data packets.

At 308, an acknowledgment message is sent by the second network device 116 to the first network device 114, in response to receiving a service message of the plurality of service messages. For example, in response to receiving the first service message from the first network device 114, the second network device 116 may send an acknowledgment message within a pre-defined time period. For example, such a pre-defined time period may be set by a network administrator. Upon receiving an acknowledgment message corresponding to the first service message within the pre-defined time period, the first network device 114 may proceed to send the second service message. It may be noted that in case of failure in receiving the acknowledgment message corresponding to the first service message within the pre-defined time period, the first network device 114 may consider the second network device as busy or unreachable, and may not proceed to send the second service message. Examples of the pre-defined time period may be 5 seconds, 7 seconds, 10 seconds, 30 seconds, and so forth.

At 310, based on a plurality of service messages and corresponding acknowledgment messages, a linked network path is established between the first network device 114 and the second network device 116. In this regard, the neighbor relationship between the first network device 114 and the second network device 116 is formed due to the linked network path. It may be noted that multiple network paths may be established between the first network device 114 and the second network device 116 for high availability of the network device 114 and 116, however, only one network path, i.e., the linked network path may be active for data transmission between the network devices 114 and 116.

At 312, the first network device 114 may send organization data packets from the organization 106 within the first AS 102 to the second network device 116, based on the service information relating to the organization 106. The organization data packets may have a header and body, wherein the header of the OP may include several routing attributes, such as organization id, vendor or ISP id, revision id, routing policies, destination IP, sender IP, and so forth, based on the service type selected by the organization. The organization data packets may then be transmitted to second network device 116 that may check if the destination IP of the data packets is within the second AS 104. If not, the second network device may route the organization data packets to other neighbor network devices, based on the service type in the service information.

At 314, the first network device 114 terminates the established stateful linked network path with the second network device 116, based on path parameters. In this regard, the first network device 114 may send a fifth service message to the second network device 116. The fifth service message (or fifth OP) includes a header, wherein the header of the fifth OP indicates data relating to the 'DESTROY' operation. The fifth OP corresponding to the 'DESTROY' operation is transmitted to initiate a destroy operation to cause termination of the linked network path between the first network device 114 and the second network device 116. Once the linked network path is destroyed, the second network device 116 may become unreachable. In an example, the 'DESTROY' operation may be initiated based on path parameters of the linked network path. For example, when the path parameters of the linked network path indicate that the linked network path is no more required, or failure or malicious activity has occurred along the linked network path and/or at the second network device 116.

It may be noted that the examples of the plurality of service messages as described in the present example should not be construed as a limitation. In other examples, more than the above-stated plurality of service messages may be sent to the second network device 116 to establish a neighbor relationship and a stateful linked network path. In an example, the first network device 114 may send another service message to the second network device, wherein a header of the service message indicates data relating to 'PLUS' operation. The service message corresponding to the 'PLUS' operation may be transmitted to include additional policies with network operation. The policies may relate to, for example, throttling, shaping, policing, blocking, and so forth.

Figure 4:
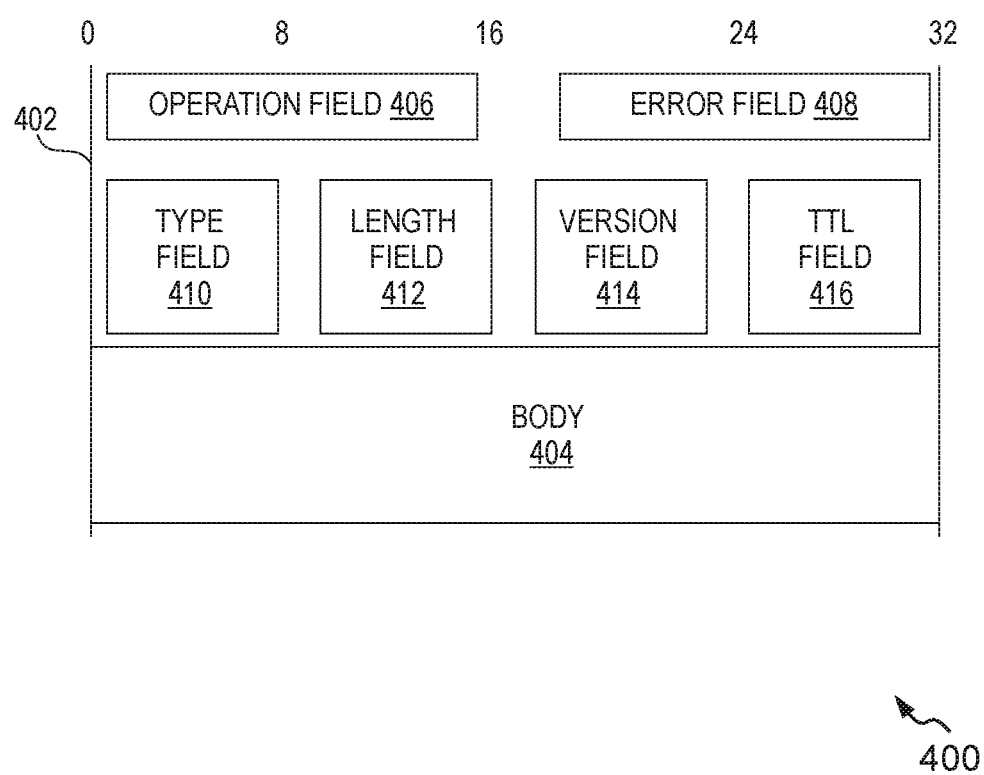
FIG. 4 shows an example representation of a service message for establishing a communication link, in accordance with an embodiment of the present disclosure.

FIG. 4 shows an example representation of a service message 400 for establishing a communication link, in accordance with an embodiment of the present disclosure. As mentioned previously, a service message 400 may also be referred to as an organization packet (OP). The service message 400 may include a packet header 402 and a body 404, wherein the packet header includes a plurality of data fields. In an example, an OTGP session runs by sending a plurality of service messages. For example, a first network device 114 may send at least four service messages to for the neighbor relationship with a second network device 116. However, in certain cases, more than four service messages may also be sent to create and/or maintain a neighbor relationship and perform data transfer.

The plurality of service messages, such as the service message 400 may use the same packet header 402 format. For example, the plurality of service messages are transmitted on TCP port 399, or any other pre-configured relating to any protocol, such as UDP, BGP, IGP, and so on. The plurality of service messages may be sent by the first network device 114 to the second network device 116 in an iterative manner to form a neighbor relationship. In response to receiving a first service message, the second network device 116 may send an acknowledgment. Thereafter, on determining the acknowledgment to be a positive acknowledgment, the first network device 114 may send a second service message and wait for acknowledgment corresponding to the second service message. In an example, acknowledgments sent by the second network device 116 may have the same format as that of the service messages sent by the first network device 114. For example, values corresponding to a plurality of fields in the header of the first service message may be the same as values corresponding to the plurality of fields in the header of the acknowledgment received in response to the first service message. In an example, the length of the OTGP service message may vary from 19 bytes (or octets) to 4096 bytes.

In an example, the service message 400 includes the packet header 402 including a set of data fields. The set of data fields includes an operation field 406, an error field 408, a type field 410, a length field 412, a version field 414, and a time to live (TTL) field 416. The packet header 402 of the service message 400 includes an operation field 406. The operation field 406 may be 16-bit (or 2 bytes) long. The operation field 406 carries data required to indicate an operation or an action to be performed in response to the transmission of the service message 400. For example, if the service message is a first service message, then the operation field 406 indicates a 'REACH' operation to initiate probing of peer or neighbor network device, over a pre-configured port. If the service message is a second service message, then the operation field 406 indicates an 'ATTEMPT' operation to perform negotiation of a set of parameters with a second network device 116. If the service message is a third service message, then the operation field 406 indicates an 'INTERCONNECT' operation to form a neighbor relationship or linked network path with the second network device 116, based on the negotiated set of parameters. If the service message is a fourth service message, then the operation field 406 indicates a 'NETWORK' operation to send OTGP routing information comprising OP routing table, OP service table, IP routes, frame information, OP link table, and so forth, to the second network device 116. If the service message is a fifth service message, then the operation field 406 indicates a 'DESTROY' operation to terminate or run down the linked network path between the first network device 114 and the second network device 116.

The packet header 402 of the service message 400 includes an error field 408. The error field 408 may be an 8-bit long field. A value of the error field 408 may be set to indicate an error message. For example, different values in the error field 408 may indicate different errors. In cases of no error, the error field 408 may be set to NULL.

The packet header 402 of the service message 400 includes a type field 410. The type field 410 may be a 4-bit long field. For example, a value of the type field 410 indicates a type of operation, wherein data corresponding to such operation is indicated in the operation field 406. In other words, the type field 410 indicates to the second network device 116 what operation message is embodied in the body 404 and operation field 406 of the service message 400. For example, the value of the type field 410 may be set to 0 to indicate the 'REACH' operation in the first service message. The value of the type field 410 may be set to 1 to indicate 'ATTEMPT' operation in the second service message, the value of the type field 410 may be set to 2 to indicate 'INTERCONNECT' operation in the third service message, and the value of the type field 410 may be set to 4 to indicate 'NETWORK' operation in the fourth service message.

The packet header 402 of the service message 400 includes a length field 412. The length field 412 may be an 8-bit long field. A value of the length field 412 may be set to indicate the total length of the service message 400. The length of the service message 400 may include a length of the header 402 and a length of the body 404. For example, the length of the service message 400 may be indicated in octets or bytes and may range between 19 bytes to 4096 bytes.

Further, the packet header 402 of the service message 400 includes a version field 414 and TTL field 416. The version field 414 may be 2-bit, while the TTL field 416 may be 8-bit long. A value of the version field 414 may indicate a version number of the OTGP. As may be understood, with each update in the OTGP, the version number may get incremented by, for example, 1. A value of the TTL field 416 may indicate the number of routers or network devices that the service message has passed through. For example, the first network device 114 may assign a random TTL value in the TTL field 416, say 10, and forward the service message 400 to the second network device 116. The second network device 116 may decrease the TTL value by, for example, 1 and set it to 9. If the second network device is the destination router for the service message 400 then the decrement in TTL value may stop. However, if the second network device 116 is not the destination router for the service message 400, then it may forward the service message 400 to a third network device, wherein the third network device may further decrease the TTL value by 1 and set it to 8. It may be noted that the first network device 114 may set the initial TTL value higher than the maximum number of hops that the service message 400 has to perform before reaching the destination router. Subsequently, the TTL value must not be 0 before it reaches the destination router.

Moreover, the service message 400 includes the body 404. The body 404 may be 10 bit to 32 bit long. Further, the body 404 of the service message 400 may include actual data corresponding to the operation associated with the service message 400. As may be understood, the operation to be performed may be indicated based on the value of the operation field 406 and the type of the operation may be indicated based on the type field 410. The body 404 may include all the data or information required to carry out the operation. For example, for the first service message where the operation field 406 indicates 'REACH' operation, the body may include "hello". For the second service message where the operation field 406 indicates 'ATTEMPT' operation, the body may include "confirming" along with values for a set of parameters. Such parameters may be at least one of, for example, IP type, service type, cluster id, version, and preferred path. For the third service message where the operation field 406 indicates 'INTERCONNECT' operation, the body may include "link" along with values for a set of connection attributes. Such connection attributes may be at least one of, for example, peer status, hold time, customer or organization id, vendor or ISP id, revision id, and authentication. For the fourth service message where the operation field 406 indicates 'NETWORK' operation, the body may include OTGP routing information, for example, routing policies based on service type, IP routes, ethernet frames, frames information, VPN packets, route tables, and so forth.

In an example, the OTGP routing information may include an Organization Protocol (OP) routing table, an OP service table, and an OP link table. The OP routing table may include a list of a plurality of network devices associated with a plurality of autonomous systems and corresponding hops to reach them. The plurality of autonomous systems may or may not be serviced by the same ISP. Further, the OP service table may include a list indicating service types associated with the plurality of network devices. It may be noted that the service type relating to a network device may be based on the organization that is serviced by the network device. For example, the service type may be indicated as a service plan that the organization may have selected during registering for service, or any time after that. Further, the OP link table may include a list indicating link information between the plurality of network devices. The link information may indicate communication links and the number of paths between different network devices. It may be noted that the routing information comprising the above-mentions OP routing table, OP service table, and OP link table is only exemplary and in other examples of the present disclosure, the OTGP routing information may include other tables for reliable secure routing of data packets.

It may be noted that the terms "first", "second", third", "fourth", and "fifth" used in conjunction with the term "service message" are only identifiers to distinguish different service messages, and does not indicate an order of transmission of the service messages. In other words, service messages other than the five service messages stated in the present disclosure may be sent to the second network device 116 in a suitable order. For example, a sixth service message corresponding to a plus operation for adding certain policies may be sent to the second network device 116 after the second service message and before the third service message. Similarly, other service messages may be sent to the second network device 116 to keep the connection between the first network device 114 and the second network device 116 alive.

Figure 5:
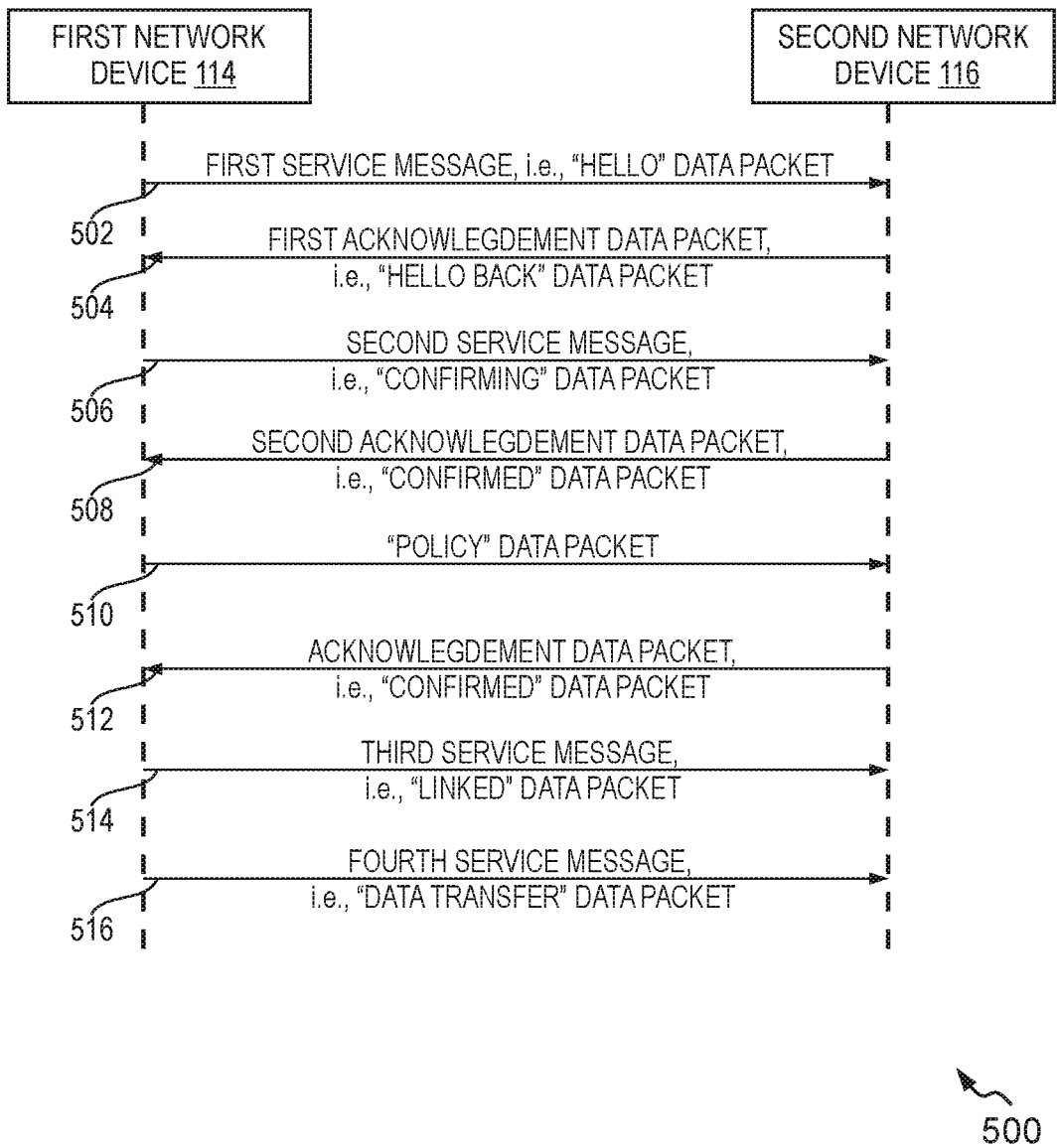
FIG. 5 shows an example representation of a header format of a service message for establishing a communication link, in accordance with an embodiment of the present disclosure.

FIG. 5 shows an example representation 500 of the exchange of a plurality of service messages for establishing a communication link, in accordance with an embodiment of the present disclosure. The plurality of service messages may be sent iteratively by a first network device 114 in a first AS 102 to a second network device 116 in a second AS 104. An ISP may provide internet services to an organization 106, via the first AS 102. Subsequently, the first network device 114 may be configured to route data packets from the organization to the corresponding destination, for example, to the second network device 116 or via the second network device 116. In this regard, the plurality of service messages is sent by the first network device 114 to the second network device 116 to establish a neighbor relationship with the second network device 116.

In an example, before sending a first service message from the plurality of service messages, the first network device 114 may send a ping or a TCP packet to a directly connected network device, say, the second network device 116. This way, the first network device 114 may check if the directly connected network devices are listening on a TCP port. Thereafter, the first network device 114 may send the plurality of service messages to perform a handshake with the second network device 116 to establish a neighbor relationship with the second network device 116.

At 502, the first network device 114 sends the first service message to discover or probe the second network device 116. The first service message includes a "Hello" data packet. The first network device 114 sends the "Hello" data packet on a pre-configured port on which the OTGP session runs, for example, TCP port 399. The first network device 114 sends the "Hello" data packet to check whether the second network device 116 is listening on the pre-configured port with its identifier field. In other words, the first network device 114 checks if the second network device 116 supports OTGP sessions on it.

At 504, the first network device 114 receives a first acknowledgment data packet corresponding to the first service message from the second network device 116. The first acknowledgment data packet may be a "Hello back" data packet. The second network device 116 may send the "Hello back" data packet along with the identifier field associated with the second network device 116. Based on sending the "Hello back" data packet, the second network device 116 acknowledges that it is listening on the pre-configured port, for example, TCP port 399.

At 506, the first network device 114 sends a second service message to perform negotiation (i.e., 'ATTEMPT' operation) with the second network device 116 or neighboring routers. The second service message may be a "Confirming" data packet. The first network device 114 sends the "Confirming" data packet to confirm whether a set of parameters are acceptable to the second network device 116. The set of parameters may include, for example, the IP type on which the OTGP is running, service type selected by the organization, and preferred path based on metric calculation or user selection. In other words, the first network device 112 attempts to negotiate the set of parameters and check which neighbor network device is willing to accept the set of parameters. If the first network device 112 finds no one then it will send an error and peer with default condition with a router. The purpose of the 'ATTEMPT' operation is to eliminate broadcasting. In OTGP, all services are connection-oriented neighbors and nothing is broadcasted. In other protocols including BGP, if they don't know where the network is, it will either broadcast or send to the default gateway. In OTGP this is not the case as this is negotiated well before during the neighbor formation phase.

At 508, the first network device 114 receives a second acknowledgment data packet corresponding to the second service message from the second network device 116. The second acknowledgment data packet may be a "Confirmed" data packet. The second network device 116 may send the "Confirmed" data packet to confirm that the set of parameters are matched and the second network device 116 is ready for the next step. In one embodiment, the second network device 116 may send an error message.

At 510, the first network device 114 sends a policy data packet when there is a specific routing policy to be followed. For example, the specific routing policy in the "Policy" data packets may be based on a service type selected or defined by the organization 106.

At 512, the first network device 114 receives a third acknowledgment data packet corresponding to the policy data packet from the second network device 116. The third acknowledgment data packet may be a "Confirmed" data packet. The second network device 116 may send the "Confirmed" data packet to confirm that the specific routing policy has been accepted by the second network device 116.

At 514, the first network device 114 sends a third service message to establish a linked network path with the second network device 116. The third service message may be a "Linked" data packet. By sending the "Linked" data packet, the first network device 114 may confirm that the second network device 116 is a trusted neighbor and marks the second network device 116 as linked. For example, the "Linked" data packet may include values corresponding to a set of connection attributes, such as peer status, hold time, organization id, vendor id, revision id, and authentication. The link between the first network device 114 and the second network device 116 may be stateful. Although the present example doesn't depict that any acknowledgment data packet is received by the first network device 114 corresponding to the "Linked" data packet, it should not be construed as a failure in connection. It may be noted that in certain cases, positive acknowledgment corresponding to the "Linked" data packets may not be required. However, in other cases "Link confirmed" data packet may be received by the first network device 114 from the second network device 116 in form of a positive acknowledgment.

At 516, the first network device 114 sends a fourth service message to the second network device 116 to exchange OTGP routing information associated with the organization. The fourth service message may be the "Data transfer" data packet. For example, when the linked state is achieved between the first network device 114 and the second network device 116, data is exchanged. By sending the "data transfer" data packet, the OTGP routing information based on the service type of the organization may be sent to the second network device 116.

Thereafter, organization data packets containing actual data may be routed to the second network device 116 via the established secure linked network path and based on routing policy and service type selected by the organization. It may be noted that if the connection between the first network device 114 and the second network device 116 is a TCP connection, constant keep-alive messages in form of service messages may be sent periodically to make sure that both the first network device 114 and the second network device 116 are awake and listening to pre-configured port for data or state packets.

Although the present example depicts that positive acknowledgment is received from the second network device 116. However, in certain cases, a negative acknowledgment may be received from the second network device 116 after sending any of the service messages, say, after the first service message, the second service message, the third service message, or the fourth service message. In such a case, the first network device may search for another neighbor peer to establish a neighbor relationship for routing of data packets.

Figure 6:
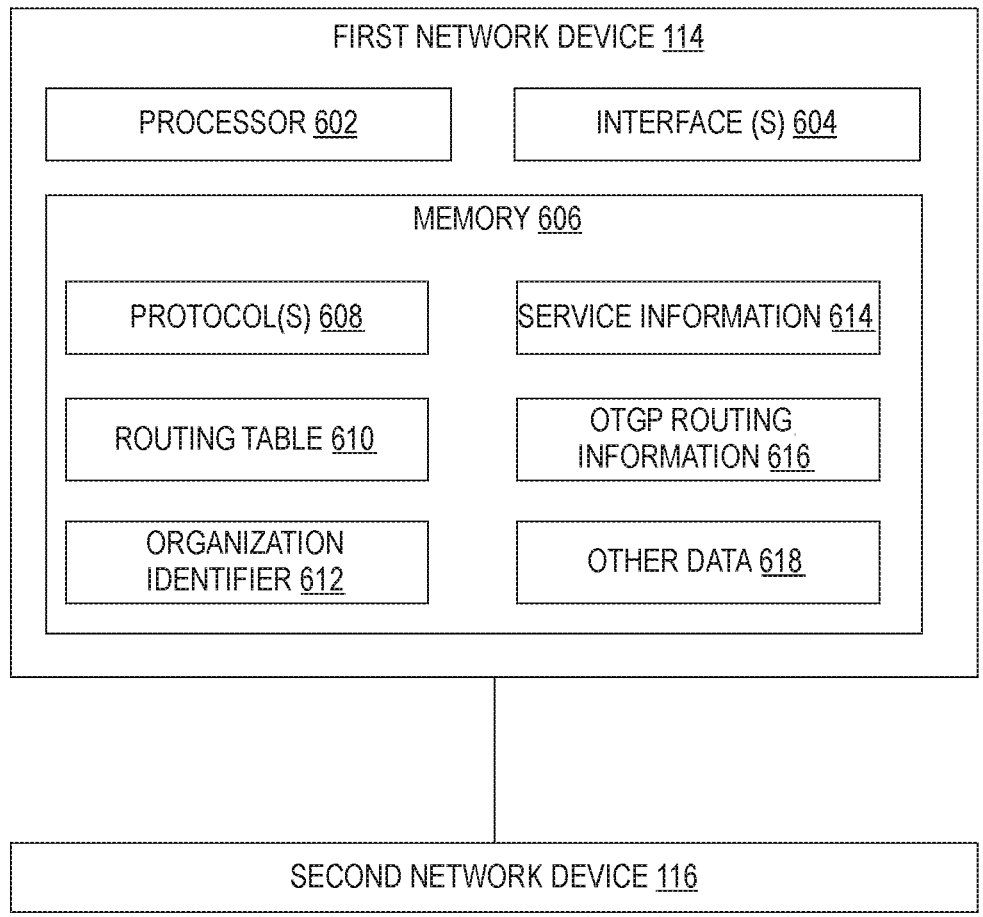
FIG. 6 illustrates a block diagram representation of a network device capable of implementing various embodiments of the present disclosure.

FIG. 6 illustrates a block diagram representation of a first network device 114 connected to a second network device 116 capable of implementing various embodiments of the present disclosure. In the present example, the first network device 114 includes processor 602, interface 604, and memory 606. The processor 602, the interface 604, and the memory 606 may be connected by using a bus. In this embodiment of the present disclosure, the processor 602 is configured to control and manage an action of the first network device 114. For example, the processor 602 is configured to perform steps 202-206 in FIG. 2, and steps 502-516 in FIG. 5, and/or another process of the technology described in this specification. The interface 604 is configured to support communication of the first network device 114. The memory 606 is configured to store program code and data of the first network device 114.

The processor 602 may be a central processing unit, a general-purpose processor, a digital signal processor, an application-specific integrated circuit, a field-programmable gate array, or another programmable logic device, a transistor logic device, a hardware component, or any combination thereof. The processor 602 may implement or execute various example logical blocks, modules, and circuits described with reference to content disclosed in this application. Alternatively, the processor 602 may be a combination for implementing a computing function, for example, a combination of one or more microprocessors, or a combination of a digital signal processor and a microprocessor.

The memory 606 may be computer-operated hardware suitable for storing and/or retrieving data, such as, but not limited to, protocol(s) 608, routing table 610, organization identifier 612, service information 614, OTGP routing information 616, and other data 618. The memory 606 may include multiple storage units such as hard disks and/or solid-state disks in a redundant array of inexpensive disks (RAID) configuration. The memory 606 may include a storage area network (SAN) and/or a network-attached storage (NAS) system. In some alternate embodiments, the memory 606 may also include magnetic storage devices (such as hard disk drives, floppy disks, magnetic tapes, etc.), optical magnetic storage devices (e.g., magneto-optical disks), semiconductor memories (such as mask ROM, PROM (programmable ROM), EPROM (erasable PROM), Phase-change memory, flash ROM, RAM (random access memory)), etc.

In some embodiments, the memory 606 is integrated within the first network device 114. For example, the first network device 114 may include one or more hard disk drives as the memory 606. In other embodiments, the memory 606 is external to the first network device 114 and may be accessed by the first network device 114 using a bus. The bus may be a peripheral component interconnect (Peripheral Component Interconnect, PCI) bus or an extended industry standard architecture (Extended Industry Standard Architecture, EISA) bus, or the like. The bus may be classified into an address bus, a data bus, a control bus, and the like.

In operation, the processor 602 of the first network device 114 may access routing table 610 that indicates a communication port for communicating TCP packets to neighbors. The processor 602 may also access service information 614 for an organization may that it services, such as the organization 106. The processor 602 may access the service information 614 based on an organization identifier 612. For example, the processor may retrieve organization identifier 612 from a node associated with the first organization 106, or an ISP associated with the first network device 114. Further, the service information 614 may indicate a service type selected by the organization 106 for routing data packets from the organization 106 to the destination address.

Once the processor 602 determines that neighbor routers are pingable, the processor 602 may then send a plurality of service messages to form a neighbor relationship. The processor 602 sends a first service message on a pre-configured port to initiate discovery of neighbor network devices, such as a second network device 116. The processor 602 sends a second service message to negotiate a set of parameters with the second network device 116. The set of parameters include attributes relating to the service type that is selected by the organization to define its routing policy. Based on the set of parameters, the processor 602 sends a third service message to establish a linked network path with the second network device 116. In this manner, the linked network path or trusted neighbor relationship is formed based on the service type selected by the organization. Further, the processor 602 sends a fourth service message to exchange OTGP routing information 616 with the second network device 116. The OTGP routing information 616 may include OP route tables, OP service table indicating service types, OP link table, frames information, VPN information, security information, and so forth. For example, the first network device 114 may retrieve the OTGP routing information 616 from a database associated with the ISP and the further periodically updated.

Thereafter, the processor 602 sends organization data packets to the second network device 116. Specifically, the processor sends the organization data packets to the second network device 116 upon receiving a positive acknowledgment corresponding to each of the plurality of service messages from the second network device 116.

The disclosed methods and/or the flow diagrams 200, 300, and 600 as disclosed herein may be implemented using software including computer-executable stored on one or more computer-readable storage medium (e.g., non-transitory computer-readable medium, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, netbook, Webbook, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during implementation of the disclosed methods may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber-optic cable), magnetic communications, electromagnetic communications (including RF, microwave, and infrared communications), mobile communications, or other such communication means.

Further, the methods may be practiced by a computer system including one or more processors and computer-readable media such as computer memory. In particular, the computer memory may store computer-executable instructions that when executed by one or more processors cause various functions to be performed, such as the acts recited in the above embodiments.

Embodiments of the present disclosure may comprise or utilize a special purpose or general-purpose computer including computer hardware, as discussed in greater detail below. Embodiments within the scope of the present disclosure also include physical and other computer-readable media for carrying or storing computer-executable instructions and/or data structures. Such computer-readable media may be any available media that may be accessed by a general-purpose or special-purpose computer system. Computer-readable media that store computer-executable instructions are physical storage media. Computer-readable media that carry computer-executable instructions are transmission media. Thus, by way of example, and not limitation, embodiments of the present disclosure can comprise at least two distinctly different kinds of computer-readable media: physical computer-readable storage media and transmission computer-readable media.

Physical computer-readable storage media includes RAM, ROM, EEPROM, CDROM or other optical disk storage (such as CDs, DVDs, etc.), magnetic disk storage or other magnetic storage devices, or any other medium which can be used to store desired program code means in the form of computer-executable instructions or data structures and which can be accessed by a general-purpose or special-purpose computer.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
   accessing, by a first network device associated with a first autonomous system, a routing table and service information associated with the first autonomous system, the service information being accessed based, at least in part, on an organization identifier of an organization associated with the first autonomous system;
   sending, by the first network device, a plurality of service messages to establish an organization transit gateway protocol (OTGP) session with a second network device associated with a second autonomous system, wherein the plurality of service messages comprises:
   a first service message to be transmitted over a pre-configured port to initiate a discovery operation of the second network device, a second service message to be transmitted to perform a negotiation operation with the second network device, wherein the negotiation operation is performed for a set of parameters relating to data transfer, a third service message to be transmitted to establish a linked network path with the second network device based at least on a set of parameters, and a fourth service message to be transmitted to initiate a data transfer operation, wherein
   the data transfer operation comprises transmission of OTGP routing information for routing of data packets, and wherein
   the OTGP routing information is determined based on the service information of the organization; and upon receiving a positive acknowledgment corresponding to each of the plurality of service messages from the second network device, transferring, by the first network device, the data packets to the second network device based on the OTGP routing information relating to the organization; wherein
   the OTGP routing information comprises:
   an Organization Protocol (OP) routing table indicating a list of a plurality of network devices associated with a plurality of autonomous systems and corresponding hops;
   an OP service table indicating service types associated with the plurality of network devices; and
   an OP link table indicating link information between the plurality of network devices; and wherein
   the first network device assigns a connection tag to a peer connection between the first network device and the second network device based, at least in part, on a set of connection attributes received from the second network device in response to the third service message.

2. The computer-implemented method of claim 1, wherein the plurality of service messages further comprises a fifth service message, the fifth service message to be transmitted to initiate a destroy operation, and wherein the destroy operation causes termination of the linked network path between the first network device and the second network device.

3. The computer-implemented method of claim 1, wherein each service message comprises a packet header including a set of data fields, wherein the set of data fields comprises an operation field, an error field, a type field, a length field, a version field, and a time to live (TTL) field.

4. The computer-implemented method of claim 3, wherein the operation field includes data required to indicate an operation associated with a corresponding service message.

5. The computer-implemented method of claim 1, wherein the set of parameters comprises at least service type, IP type, preferred path, cluster identifier, and version identifier.

6. The computer-implemented method of claim 1, wherein the linked network path is established between the first network device and the second network device based at least on exchange of the plurality of service messages and corresponding positive acknowledgments.

7. A device comprising:
   a memory;
   an interface; and
   a processor communicably coupled to the memory and the interface, wherein the memory stores instructions that configure the processor to perform at least:
   access a routing table and service information of a first autonomous system, the first autonomous system associated with the device, the service information being accessed based at least in part on an organization identifier of an organization associated with the first autonomous system;
   send a plurality of service messages to establish an organization transit gateway protocol (OTGP) session with a network device associated with a second autonomous system, wherein the plurality of service messages comprises:
   a first service message to be transmitted over a pre-configured port to initiate a discovery operation of the network device, a second service message to be transmitted to perform a negotiation operation with the network device, wherein the negotiation operation is performed for a set of parameters relating to data transfer, a third service message to be transmitted to establish a linked network path with the network device based at least on the set of parameters, and a fourth service message to be transmitted to initiate a data transfer operation, wherein the data transfer operation comprises transmission of OTGP routing information for routing of data packets, and wherein the OTGP routing information is determined based on the service information of the organization; and upon reception of a positive acknowledgment corresponding to each of the plurality of service messages from the network device, transfer the data packets to the network device based on the OTGP routing information relating to the organization; wherein the OTGP routing information comprises:

an organization protocol (OP) routing table indicating a list of a plurality of network devices associated with a plurality of autonomous systems and corresponding hops;

an OP service table indicating service types associated with the plurality of network devices; and an OP link table indicating link information between the plurality of network devices; and wherein the processor is configured to assign a connection tag to a peer connection between the device and the network device based, at least in part, on a set of connection attributes received from the network device in response to the third service message.

8. The device of claim 7, wherein each service message comprises a packet header including a set of data fields, and wherein the set of data fields comprises an operation field, an error field, a type field, a length field, a version field, and a time to live (TTL) field.

9. The device of claim 8, wherein the operation field includes data required to indicate an operation associated with a corresponding service message.

10. The device of claim 7, wherein the set of parameters comprises at least service type, IP type, preferred path, cluster identifier, and version identifier.

* * * * *